United States Patent
Smith et al.

(10) Patent No.: US 12,225,919 B2
(45) Date of Patent: Feb. 18, 2025

(54) TASTE-MASKING FORMULATION FOR KETONE BODY COMPOUNDS

(71) Applicant: NeuroEnergy Ventures, Inc., New York, NY (US)

(72) Inventors: Houston Smith, St. Louis, MO (US); Bernadita P. Desierto, Hoffman Estates, IL (US); Beverly Ann Schad, Union, MO (US); Danielle Lasota, Carol Stream, IL (US); Sean Whittemore, Chesterfield, MO (US)

(73) Assignee: NeuroEnergy Ventures, Inc., New York, NY (US)

( * ) Notice: Subject to any disclaimer, the term of this patent is extended or adjusted under 35 U.S.C. 154(b) by 722 days.

(21) Appl. No.: 17/433,537

(22) PCT Filed: Feb. 21, 2020

(86) PCT No.: PCT/US2020/019174
§ 371 (c)(1),
(2) Date: Aug. 24, 2021

(87) PCT Pub. No.: WO2020/185368
PCT Pub. Date: Sep. 17, 2020

(65) Prior Publication Data
US 2022/0183327 A1 Jun. 16, 2022
US 2022/0338510 A2 Oct. 27, 2022

Related U.S. Application Data

(60) Provisional application No. 62/818,208, filed on Mar. 14, 2019.

(51) Int. Cl.
*A23L 2/60* (2006.01)
*A23L 27/00* (2016.01)

(52) U.S. Cl.
CPC ............ *A23L 2/60* (2013.01); *A23L 27/84* (2016.08); *A23L 27/86* (2016.08)

(58) Field of Classification Search
CPC ............ A23L 27/84; A23L 27/86; A23L 2/60; A23L 33/10
See application file for complete search history.

(56) References Cited

U.S. PATENT DOCUMENTS

| | | |
|---|---|---|
| 7,939,671 B2 | 5/2011 | Li et al. |
| 2013/0102663 A1 | 4/2013 | Clarke |
| 2015/0238613 A1 | 8/2015 | Lin et al. |
| 2016/0376263 A1 | 12/2016 | Patron |
| 2017/0258745 A1 | 9/2017 | Millet |
| 2018/0177753 A1 | 6/2018 | Hashim |
| 2020/0222353 A1 | 7/2020 | Thompson |

FOREIGN PATENT DOCUMENTS

WO 2011101171 A1 8/2011

OTHER PUBLICATIONS

Cherian, et al; pward Improving Medication Adherence: The Supression of Bitter Taste in Edible Taste Films; Adv Pharmacol Sci; Published online Jun. 25, 2018, 23 pages; doi: 10.1155/2018/8043837.
EPO SearchReport of Jun. 23, 2023 Citation of Art in corresponding application EP20771103.7.
CA_3097783—Dec. 22, 2020—Office_Action.
CA_3097783—Jun. 30, 2021—Office_Action.
CA_3097783—Nov. 25, 2021_Office_Action.
CN_202080019751.1_Jan. 19, 2024—OA1—translation.
EP_3937656_Dec. 14, 2023—EPO_Official_Letter.
IL_278422_Nov. 3, 2021_Office_Action—English_followed_by_Hebrew.
JP_2021-553788_Apr. 4, 2023_Translation_of_1st_OA.

*Primary Examiner* — Vera Stulii
(74) *Attorney, Agent, or Firm* — Irving M Fishman

(57) ABSTRACT

A taste-masking formulation for distasteful ketone body compounds is disclosed.

11 Claims, No Drawings

TASTE-MASKING FORMULATION FOR KETONE BODY COMPOUNDS

CROSS-REFERENCE TO RELATED APPLICATIONS

This application is a continuation of US National Phase filing of PCT/US2020/019174, filed 2020 Feb. 21, which claims priority from US Provisional Patent Application Ser. No. U.S. 63/818,208, filed 2019 Mar. 14.

STATEMENT REGARDING FEDERALLY SPONSORED RESEARCH OR DEVELOPMENT

Not Applicable

FIELD OF THE INVENTION

The present invention is directed to the field taste-masking of distasteful compounds, in particular of the ketone bodies 3-hydroxybutyric acid and acetoacetic acid in the form of (a) their alkali metal salt(s), (b) esters between molecules of such ketone bodies, (c) esters of such ketone bodies with ketone body progenitors, (d) esters of such ketone bodies with glycerin, and (e) amides of such ketone bodies with appropriate amines for oral consumption by humans and other animals.

BACKGROUND OF THE INVENTION

Taste-masking of distasteful oral materials is an old practice particularly in the practice of medicine, particularly with the oral administration of distasteful drugs and plant extracts. The basic practice was to add pleasant tasting innocuous materials to help overcome the distasteful medicinal compounds or extracts. Typically, one simply added sweeteners (sugars or honey) to the formulation. Unfortunately, this practice was only barely sufficient for only a limited number of situations. Another practice was to also add natural (and in more modern times, synthetic) flavoring agents. Again, this practice also only worked for a limited number of situations.

Taste perception is a complex phenomenon involving not only taste receptors in the oral cavity, but also aroma receptors in the oral and nasal cavities as well as mouthfeel perceptions in the oral cavity. True complete taste-masking addresses each of these issues where they are otherwise present. Taste-masking can act by (a) blocking the various taste-receptors by overwhelming the taste receptors with large amounts of pleasant tasting activating compounds, (b) blocking the various taste receptors by being either a more strongly bonding competitive inhibitor or a non-competitive inhibitor of the various taste receptors, or (c) numbing the various taste receptors for the short period of time when the offensive tasting material is in the mouth. However, unless one knows the particular pattern of receptors involved in sensing the offensive taste, this is simply a trial and error approach utilizing the known materials that might act as taste-masking materials.

Further complicating the situation is that taste and smell are intimately connected, and the aromatic aspects of the offensive-tasting material must also be addressed adequately. Again, this involves multiple receptors in the oral and nasal cavity, and is partially dependent upon the volatile nature of one or more components of the offensive-tasting materials, not only per se, but also as those materials interact with other formulation components and their volatility may change when introduced into the oral cavity during administration. Again, without knowing the precise receptor pattern at play, one is left with a completely trial and error approach to selection of the proper taste-masking agent(s) that will adequately address both taste and aroma aspects.

A third component of the taste-masking dilemma is the mouthfeel of the offensive-tasting material and the need to mask this aspect when it is present as well. A taste-masking formulation which does not address an overly gritty material feel or a slimy material feel, will generate negative reactions in the oral administration of the formulation.

Efforts at overcoming the above have led to the use of tablets and capsules (into which the offensive material formulation is placed) and the capsule or tablet is swallowed to be dissolved after it leaves the oral cavity. This works well for materials which only require relatively small amounts to be administered at a single time, amounts certainly under 1 gram and typically under 750 mg at a time. A second approach has been to use microencapsulation which can be used over a wide range of active materials, but the microencapsulation typically increases the weight and volume of the total dosage amount considerably so that where multiple grams or more are to be administered at a single dosage, the volume that needs to be consumed is both impracticable and leads to complete non-compliance with the dosage regimen. Thus, these efforts are not available when dosages of the pure offensive-tasting material are in excess of even as small an amount as 2 grams per dose.

In addition to all of the above, the taste masking formulation needs to be chemical and physically stable for a commercially reasonable period of time that is sufficient to allow for manufacture of the formulation, storage in the manufacturing facility, distribution through commercial distribution networks, storage at the distribution centers, distribution to the point of sale to the consumer, and adequate shelf life thereafter to allow the consumer to use the formulation in the normal course. These additional requirements further limit the ultimate choices made in the taste-masking formulation components selection completely independent of the taste-masking ability of the individual components over the offensive-tasting material.

In summary, finding an appropriate taste-masking formulation which makes an offensive-tasting material palatable for administration in amounts of greater than 10 grams per dose is truly a trial and error approach.

OBJECTS OF THE INVENTION

An object of the invention is to provide a formulation for an offensive-tasting ketone body material that is palatable for administration to humans via oral administration in amounts greater than 10 grams per dose.

Another object of the invention is to provide a formulation for an offensive-tasting ketone body material that is palatable for administration to humans via oral administration in amounts sufficient to provide a blood ketone body level in the range of 2-10 mM.

Yet another object of the invention is to provide an orally administrable palatable formulation of a glyceryl ester of 3-hydroxybutyric acid.

Still another object of the invention is to provide an orally administrable palatable formulation of the ester glyceryl tris(3-hydroxybutyrate).

Even further objects of the invention will become apparent to those of ordinary skill in the art after having benefit of the instant application.

BRIEF SUMMARY OF THE INVENTION

In brief, the foregoing objects of the invention and others can be obtained by a formulation comprising
one or more ketone body materials selected from ketone body alkali metal salts, ketone body esters with other ketone bodies, ketone body esters with ketone body precursors, ketone body esters with glycerine, and ketone body amides with physiologically acceptable amines;
propylene glycol;
ethanol;
water;
natural or synthetic flavor;
sweetener (any high potency sweetener, but preferably sucralose) and
a bitter masking agent.
The formulation can be used for any purpose that exogenous ketone body supplementation is desired, most preferably as a medical food.

BRIEF DESCRIPTION OF THE DRAWING

Not Applicable

DETAILED DESCRIPTION OF THE INVENTION

The present invention is directed to an orally palatable formulation comprising
one or more ketone body materials selected from ketone body alkali metal salts, ketone body esters with other ketone bodies, ketone body esters with ketone body precursors, ketone body esters with glycerine, and ketone body amides with physiologically acceptable amines;
propylene glycol;
ethanol;
water;
natural or synthetic flavor;
a high potency sweetener; and
a bitter masking agent.
In all references to the term "comprising" it is intended that the terms "consisting essentially of" and "consisting of" are equally disclosed. All references to any Patent or Patent Application in this specification shall be construed to including such Patent and such Patent Application as an incorporated by reference in their entirety but only to the extent that they supplement but do not contradict the specific statements in this specification. Any statement in any incorporation by reference herein, that contradicts any portion of this specification, shall be deemed null and void as an incorporation by reference of that contradictory statement. Any use of the term "about" shall be construed to mean that the last digit in the immediately following number as in the following non-limiting examples (a) "about 0.54" shall be deemed to cover the range of at least 0.535 to <0.545 and (b) "about 24" shall be construed to mean a range of at least 23.5 to <24.5. For any number preceeded by "about, the absolute number shall be deemed to be disclosed as well as in "about 0.54" shall be deemed to be a specific disclosure of "0.54" as well as the range in the prior sentence.

The ketone body material that is distasteful is selected from (a) ketone body alkali metal salts, which can be independently the lithium, sodium or potassium salts or mixtures thereof; (b) ketone body esters with other ketone bodies such as, without limitation, 3-(3-hydroxybutyroyl))-O-butyric acid, 3-(acetacetyl)-O-butyric acid, etc, or mixtures thereof; (e) ketone body esters with ketone body precursors such as, without limitation, 3-butyryl-O-butyric acid, etc or mixtures thereof; (d) ketone body esters with glycerine such as those set forth in U.S. Pat. No. 7,807,718 (incorporated in its entirety by reference), especially the glyceryl-tris(3-hydroxybutyrate) ester (hereinafter "GTβHB"); or (e) ketone body amides of physiologically acceptable amines such as, without limitation, tris(hydroxymethyl) aminomethane (TRIS), etc. Preferably, the ketone body material is selected from 3-hydroxybutyl-3-hydroxybutyrate, 1,3.-butandiol-3-hydroxybutyrate monoester, and those set forth in U.S. Pat. No. 7,807,718 (incorporated herein by reference), and most preferably is glyceryl-tris(3-hydroxybutyrate), hereinafter "GTβHB". The balance of this disclosure will be with reference to GTβHB, but shall be understood (unless the context specifically indicated otherwise) to be applicable to the other ketone body materials set forth above as well.

The ketone body compound is present in the final formulation in an amount of about 85.0 parts by weight (pbw) to about 89.0 pbw, preferably about 85.7 pbw to about 88.3 pbw, more preferably about 87.0 pbw, but more generally can be selected from any range constructed by selecting 2 amounts from about 85.0 pbw, about 85.25 pbw, about 85.5 pbw, about 85.7 pbw, about 85.75 pbw, about 86.0 pbw, about 86.25 pbw, about 86.5 pbw, about 86.75 pbw, about 87.0 pbw, about 87.25 pbw, about 87.5 pbw, about 87.75 pbw, about 88.0 pbw, about 88.23 pbw, about 88.3 pbw, about 88.5 pbw, about 88.75 pbw, and about 89 pbw, and may also be specifically selected from any of the foregoing specific values.

The flavor component is primarily selected from an orange flavor or grape flavor and preferably is a natural flavor oil. The primary flavor material may be used alone or in a blend with minor amounts of other natural flavors; the primary flavor oil which comprises at least 90% of the flavor oils used, is either orange or grape, preferably in a range selected from 2 values from 90%, 91%, 92%, 93%, 94%, 95%, 96%, 97%, 98%, 99% and 100% of the flavor oils used; more preferably 95% of the total flavor oils used. The remainder of the flavor oils are selected from compatible natural flavor oils. The total flavor oils used are present in the final formulation in amounts of about 0.35 pbw to about 0.532 pbw, preferably about 0.395 pbw to about 0.483 pbw, more preferably about 0.439 pbw, but more generally can be selected from any range constructed by selecting 2 amounts from about 0.35 pbw, about 0.356 pbw, about, 0.375 pbw, about 0.395 pbw, about 0.400 pbw, about 0.41 pbw, about 0.42 pbw, about 0.43 pbw, about 0.435 pbw, about 0.439 pbw, about 0.44 pbw about 0.45 pbw, about 0.46 pbw, about 0.47 pbw, about 0.48, 0.483 pbw, about 0.49 pbw, about 0.50 pbw, about 0.51 pbw, about 0.52 pbw, about 0.53 pbw and about 0.532 pbw; and may also be specifically selected from any of the foregoing specific values.

The ethanol is preferably 95% ethanol, however, lower concentrations such as 70% ethanol or 50% ethanol (with the balance being water) provided the additional water contributed beyond the 95% ethanol is subtracted from the water component amount below. When 95% ethanol is being used, it is used in amounts of about 0.278 pbw to about 0.415 pbw, preferably about 0.309 pbw to about 0.378 pbw, more preferably about 0.343 pbw, but generally may be selected from any range constructed by selecting 2 amounts from about 0.278 pbw, about 0.280 pbw, about 0.290 pbw, about 0.300 pbw, about 0.309 pbw, about 0.310 pbw, about 0.320 pbw, about 0.330 pbw, about 0.40 pbw, about 0.341 pbw, about 0.342 pbw, about 0.343 pbw, about 0.35 pbw, about 0.36 pbw, about 0.37 pbw, about 0.378 pbw, 0.380 pbw, about 0.39 pbw, about 0.40 pbw, about 0.41 pbw, and about 0.415 pbw; and may also be specifically selected from any of the foregoing specific values. When ethanol of a lower %, such as without limitation 70% is being used, it is used to give the same pure ethanol content as the above amounts of 95% ethanol would give, and the additional water contributed by the use of the lower % ethanol over and above that contributed by 95% ethanol should be subtracted from the water amounts added as a separate water component below when analyzing a particular formulation for total water content for comparison to the claims. Since the ethanol amounts above and the separately added water below are parts by weight, the contribution of water by the ethanol must be simultaneously subtracted from the ethanol weights and added to the water weights so that true comparisons for infringement determination purposes can be obtained.

The separately added water component is present in an amount of from about 0.381 pbw to about 0.569 pbw, preferably about 0.424 pbw to about 0.518 pbw, more preferably, 0.471 pbw; but generally may be selected from any range constructed by selecting 2 amounts from about 0.381 pbw, about 0.39 pbw, about 0.40 pbw, about 0.41 pbw, about 0.42 pbw, about 0.424 pbw, about 0.43 pbw, about 0.44 pbw, about 0.45 pbw, about 0.46 pbw, about 0.47 pbw, about 0.471 pbw, about 0.48 pbw, about 0.49 pbw, about 0.50 pbw, about 0.51 pbw, about 0.518 pbw, about 0.52 pbw, about 0.53 pbw, about 0.54 pbw, about 0.55 pbw, about 0.56 pbw, and about 0.569 pbw, and may also be specifically selected from any of the foregoing specific values. The separately added water amounts above do not include water introduced via the 95% ethanol used in the prior paragraph, and for comparisons for potential infringement issues, total water content will have the water contribution from the 95% ethanol added to these values. If ethanol concentrations of less than 95% are used for the ethanol component, then the water contributed by the ethanol over and above that which would be contributed by 95% ethanol (for providing the same amount of pure ethanol as contained in 95% ethanol) should be deducted from the amounts above of separately added water.

The propylene glycol in the present invention comes into the invention in two portions; one is the main solvent of the overall formulation and the second is as a component that is blended with the natural flavor, water, ethanol as a pre-blend. The propylene glycol that is pre-blended with the water, ethanol, and natural flavor oils is present in amounts of the final formulation in the range of about 0.102 pbw to about 0.151 pbw, preferably about 0.112 pbw to about 0.137 pbw, more preferably about 0.125 pbw; but generally may be selected from any range constructed by selecting 2 amounts from about 0.102 pbw, about 0.110 pbw, about 0.112 pbw, about 0.120 pbw, about 0.122 pbw, about 0.124 pbw, about 0.125 pbw, about 0.126 pbw, about 0.128 pbw, about 0.130 pbw, about 0.133 pbw, about 0.136 pbw, about 0.137, about 0.138 pbw, about 0.140 pbw, about 0.143 pbw, about 0.146 pbw, about 0.149 pbw, and about 0.151 pbw, and may also be specifically selected from any of the foregoing specific values.

The propylene glycol that is separately added as the main solvent is present in amounts, based on the final formulation, in the range of from about 8.3 pbw to about 10.925 pbw, preferably about 8.625 pbw to about 10.550 pbw, more preferably about 9.588 pbw; but generally may be selected from any range constructed by selecting 2 amounts from about 8.3 pbw, about 8.320 pbw, about 8.322 pbw, about 8.4 pbw, about 8.5 pbw, about 8.6 pbw, about 8.625 pbw, about 8.629 pbw, about 8.630 pbw, about 8.7 pbw, about 8.8 pbw, about 8.9 pbw, about 8.93 pbw, about 8,935 pbw, about 8.936 pbw, about 8.94 pbw, about 8.95 pbw, about 8.975 pbw, about 9.00pbw, about 9.10 pbw about 9.20 pbw, about 9.1 pbw, about 9.2 pbw, about 9.24 pbw, about 9.246 pbw, about 9.250 pbw, about 9.3 pbw, about 9.4 pbw, about 9.5 pbw about 9.55 pbw, about 9.575 pbw, about 9.585 pbw about 9.588 pbw, about 9.6 pbw, about 9.7 pbw, about 9.8 pbw, about 9.9 pbw, about 9.91 pbw, about 9.92 pbw, about 9.929 pbw, about 9.93 pbw, about 9.939 pbw, about 9.95 pbw, about 10.00 pbw, about 10.1 pbw, about 10.15 pbw, about 10.16 pbw, about 10.17 pbw, about 10.171 pbw, about 10.175 pbw, about 10.200 pbw, about 10.250 pbw, about 10.500 pbw, about 10.54 pbw, about 10.546 pbw, about 10.55 pbw, about 10.75 pbw, about 10.8 pbw, about 10.9 pbw, about 10.918 pbw, about 10.92 pbw, and about 10.922 pbw, and may also be specifically selected from any of the foregoing specific values. The total propylene glycol in the formulation is the sum of the propylene glycol incorporated in the pre-blend and the propylene glycol added as the main solvent.

The high potency sweetener can be any high potency sweetener, but is preferably sucralose. It is present in the final formulation in an amount of from about 1.609 pbw to about 2.404 pbw, preferably 1.788 pbw to about 2.185 pbw, more preferably from about 1.788 pbw to about 2.185 pbw, still more preferably about 1.986 pbw; but generally may be selected from any range constructed by selecting 2 amounts from about 1.609 pbw, about 1.65 pbw, about 1.70 pbw, about 1.75 pbw, about 1.78 pbw, about 1.788 pbw, about 1.89 pbw, about 1.80 pbw, about. 1.85 pbw, about 1.90 pbw, about 1.95 pbw, about 1.96 pbw, about 1.967 pbw, about 1.970 pbw; about 1.980 pbw, about 1.986 pbw, about 1.99 pbw, about 2.00 pbw, about 2.10 pbw, about 2.15 pbw, about 2.175 pbw, about 2.180 pbw, about 2.185 pbw, about 2.190 pbw, about 2.200 pbw, about 2.05 pbw, about 2.10 pbw, about 2.25 pbw, about 2.30 pbw, about 2.35 pbw, about 2.40 pbw, and about 2.404 pbw; and may also be specifically selected from any of the foregoing specific values.

The bitter masking agent is selected from the compounds within the scope of U.S. Pat. No. 7,939,671 (incorporated herein by reference), preferably (which compounds are set forth with greater specificity in paragraphs 0037.01-0037.32 below), of which the most preferred is the compound of claim 27 of that patent also known as 3-(1-((3,5-Dimethyl-isoxazol-4-yl)methyl)-1H-pyrazol-4-yl-1-(3-hydroxbenzyl) imidazolidine-2,4-dione having the structure

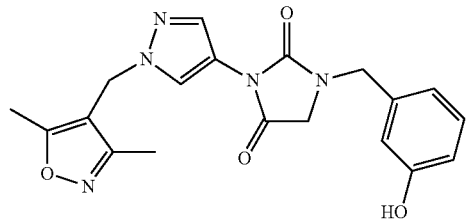 [SMILES: Cc1noc(C)c1Cn1cc(N2C(=O)CN(Cc3cccc(O)c3)C2=O)cn1]

and also known as Senomyx BB68 and Senomyx S6821. The bitter masking agent is present in an amount of from 0.039 pbw to about 0.058 pbw (rounded to 0.06 pbw), preferably about 0.042 pbw to about 0.053 pbw, more preferably about 0.048 pbw; but generally may be selected from any range constructed by selecting 2 amounts from about 0.039 pbw, about 0.040 pbw, about 0.041 pbw, about 0.042 pbw, about 0.043 pbw, about 0.044 pbw, about 0.045 pbw, about 0.046 pbw, about 0.047 pbw, about 0.048 pbw, about 0.049 pbw, about 0.050 pbw, about 0.051 pbw, about 0,052 pbw, about 0.053 pbw, about 0.054 pbw, about 0.055 pbw, about 0.0056 pbw, about 0.057 pbw, and about 0.058 pbw, and may also be specifically selected from any of the foregoing specific values.

The ketone body compound is present in an amount of from about 85 pbw to about 89 pbw, preferably about 87 pbw, but generally may be selected from any range constructed by selecting 2 amounts from about 85 pbw, 85.25 pbw, about 85.5 pbw, about 85.6 pbw, about 85.7 pbw, about 85.8 pbw, 85.9 pbw, about 86 pbw, about 86.1 pbw, about 86.2 pbw, about 86.3 pbw, about 86.4 pbw, about 86.5 pbw, about 86.6 pbw, about 86.7 pbw, about 86.8 pbw, about 86.9 pbw, about 87.0 pbw, about 87.1 pbw, about $7.2 pbw, about 87.3 pbw, about 87.4 pbw, about 87.5 pbw, about 87.6 pbw, about 87.7 pbw, about 87.8 pbw, about 87.9 pbw about 88.0 pbw, about 88.1 pbw, about 88.2 pbw, and about 88.3 pbw; and may also be specifically selected from any of the foregoing specific values.

The glyceryl esters of the ketone bodies can be those in which 3-hydroxybutyroyl groups

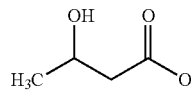

esterify 1, 2, or all 3 of the hydroxy groups in a single glycerol molecule. When less than all three of the glycerol hydroxy groups are esterified by the 3-hydroxybutyroyl group, the remaining glycerol hydroxy groups can remain unesterified, be esterified by omega-3-fatty acids, omega-6-fatty acids, omega-3,6-fatty acids, medium-chain fatty acids, or mixtures thereof. (Medium-chain fatty acids are fatty acids having carbon chains of generally 8, 10, or 12 carbons, such as for example, without limitation, one such medium-chain fatty acid in a purified form is caprylic acid.) Each 3-hydroxybutyroyl group in each molecule is independently in either D or L form and the bulk compound being administered can be a mix of any or all of the same (i.e. a mix of compounds having (a) all of the groups in the D form, (b) all of the groups in the L form, (c) some in the D-form and some in the L-form, (d) as well as mixtures of compounds selected from (1) a and b, (2) a and c, and (3) a, b, and c). Both the D and L forms of the 3-hydroxybutyroyl groups are active, however, the L form is utilized more slowly and thus, it is preferable that the 3-hydroxybutyroyl groups are substantially all or substantially all in the D form. In a particularly preferred embodiment, about 90% to 98%, more preferably about 96% of the 3-hydroxybutyroyl groups are in the D form. Nonetheless, utilization of other amounts of D vs L forms are within the invention and can be selected from 100% D to 100% L and any mixture of D and L forms in any proportions. In addition, mixtures of esters having one, two, or 3 (3-hydroxybutyryl) groups with (a) no other esterification or (b) further esterification with an omega fatty acid (either 3-omega, 6-omega, or 3,6-omega or mixtures thereof) or (c) further esterified with a medium-chain fatty acid or mixtures of different medium-chain fatty acids or (d) further esterified with both an omega fatty acid and a medium-chain fatty acid are also contemplated to be within the scope of compounds for use in the present invention. A highly preferred embodiment is one in which the compound utilized for the present invention is glyceryl tris(3-hydroxybutyrate); an even more highly preferred compound is glyceryl tris(DL 3-hydroxybutyrate), the DL referring to the bulk compound and not necessarily a mixture in a specific molecule. These compounds and a method of manufacture thereof are described more fully in U.S. Pat. No. 7,807,718, which is incorporated herein concerning the description of the compounds and their manufacture.

When the ester is glyceryl tris(3-hydroxybutyrate), it is generally orally/enterally administered in an amount that is typically in the range of 0.5 g/kg to 2.0 g/kg body weight per day (more specifically 0.5 g/kg, 0.55 g/kg, 0.6 g/kg, 0.65 g/kg, 0.7 g/kg, 0.75 g/kg, 0.8 g/kg, 0.85 g/kg, 0.9 g/kg, 0.95 g/kg, 1 g/kg, 1.1 g/kg, 1.2 g/kg, 1.3 g/kg, 1.4 g/kg, 1.5 g/kg, 1.6 g/kg, 1.7 g/kg, 1.8 g/kg, 1.9 g/kg, or 2 g/kg, as well as amounts intermediary between any of these specifically recited amounts) in 2-3 divided doses, which for a 60 kg female is about 10-40 g/serving (more specifically 10 g/serving, 12.5 g/serving, 15 g/serving, 17.5 g/serving, 20 g/serving, 22.5 g/serving, 25 g/serving, 30 g/serving, 35 g/serving, 40 g/serving as well as amounts intermediary between any of these specifically recited amounts) thrice daily (approximately every 8 hours) to about 15-60 g/serving (more specifically 15 g/serving, 17.5 g/serving, 20 g/serving, 22.5 g/serving, 25 g/serving, 27.5 g/serving, 30 g/serving, 35 g/serving, 40 g/serving, 45 g/serving, 50 g/serving, 55 g/serving, or 60 g/serving as well as amounts intermediary between any of these specifically recited amounts) twice daily (approximately every 12 hours) and for a 70 kg male is about 12-47 g/serving (more specifically 12 g/serving, 15 g/serving, 17.5 g/serving, 20 g/serving, 22.5 g/serving, 25 g/serving, 30 g/serving, 35 g/serving, 40 g/serving, 45 g/serving, 47 g/serving, as well as amounts intermediary between any of these specifically recited amounts) thrice (approximately every 8 hours) daily to about 17.5-70 g/serving (more specifically 17.5 g/serving, 20 g/serving, 22.5 g/serving, 25 g/serving, 27.5 g/serving, 30 g/serving, 35 g/serving, 40 g/serving, 45 g/serving, 50 g/serving, 55 g/serving, 60 g/serving, 65 g/serving, 70 g/serving, as well as amounts intermediary between any of these specifically recited amounts) twice (approximately every 12 hours) daily. These doses and serving sizes are intended to result in total ketone body (combined 3-hydroxybutyrate and acetoacetate) blood levels of 2-10 mM (more specifically 2 mM, 2.25 mM, 2.5 mM, 2.75 mM, 3 mM, 3.25 mM, 3.5 mM, 4 mM, 4.25 mM, 4.5 mM, 4.6 mM, 4.7 mM, 4.8 mM, 4.9 mM, 5.0 mM, 5.1 mM, 5.2 mM, 5.3 mM, 5.4 mM, 5.5 mM, 5.6 mM, 5.7 mM, 5.8 mM, 5.9 mM, 6.0 mM, 6.1 mM, 6.2 mM, 6.3 mM, 6.4 mM, 6.5 mM, 6.6 mM, 6.7 mM, 6.8 mM, 6.9 mM, 7.0 mM, 7.1 mM, 7.2 mM, 7.3 mM, 7.4 mM, 7.5 mM 7.6 mM, 7.7 mM, 7.8 mM, 7.9 mM, 8.0 mM, 8.25 mM, 8.5 mM, 8.75 mM, 9.0 mM, 9.25 mM, 9.5 mM, 9.75 mM, and 10 mM as well as intermediary levels between any of these specifically recited levels and any of these may serve as a lower end of a range or upper end of a range provided the upper end of the range is larger than the lower end of that range) in an average typical subject to whom these compounds are administered. (Acetoacetate is an oxidized form of 3-hydroxybutyrate in which the 3-hydroxy group is replaced by a 3-oxo group

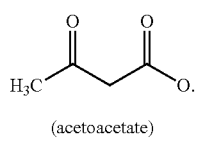

(acetoacetate)

When the esters used in the present invention are ingested orally, the esters are primarily hydrolyzed in the intestinal tract due to pancreatic lipase, releasing the 3-hydroxybutyrate moiety which is absorbed, and the body utilizes the 3-hydroxybutyrate by converting it to acetoacetate which, in turn, is actually used by the cells.) Those of ordinary skill in the art will know how to adjust these dosage amounts in subjects presenting with non-typical distribution and/or metabolisms such that the foregoing doses do not result in the blood level being in the correct range. (Such modified amounts that are administered are considered within the scope of the invention if they raise the combined blood level of 3-hydroxybutyrate and acetoacetate into the range of 2 mM to 10 mM range, notwithstanding they are outside of the "serving size" ranges or bulk g of compound administered set forth elsewhere in this specification.) When the ester is one of the other esters discussed more fully below, the dose is calculated to deliver a comparable amount of the combined 3-hydroxybutyroyl and acetoacetate moieties that is ultimately delivered by the glyceryl tris(3-hydroxybutyrate).

In the present specification, in any case where a range of values for a particular parameter is given and a more specific recitation of values within such range is given each specific value can be the basis for a new range limit as long as the lower limit is in fact less than the upper limit. By way of example, in the foregoing paragraph, the dosage range is given as "0.5 g/kg to 2.0 g/kg" with a more specific recitation of "0.5 g/kg, 0.55 g/kg, 0.6 g/kg, 0.65 g/kg, 0.7 g/kg, 0.75 g/kg, 0.8 g/kg 0.85 g/kg, 0.9 g/kg, 0.95 g/kg, 1 g/kg, 1.1 g/kg, 1.2 g/kg, 13 g/kg, 1.4 g/kg, 1.5 g/kg, 1.6 g/kg, 1.7 g/kg, 1.8 g/kg, 1.9 g/kg, or 2 g/kg". Based thereon, any of the more specific recited amounts may be the lower limit of a new range and any larger specific recited amount may be the upper limit of that new range and each such constructed range shall be deemed as specifically recited in this specification. As such, by way of example and not limitation, the ranges of 0.5 to 0.6; 0.55 to 1.9, 0.75 to 1.7, 1.8 to 1.9, etc. are all deemed recited herein. The same is applicable to the other parameters relating to dosages based on body weight, serving sizes, etc. as well.

The ester compounds for use in the present invention are administered in amounts that deliver the same amount of 3-hydroxybutyroyl and/or acetoacetate moiety as that when 0.5 g/kg to 2.0 g/kg body weight of the glyceryl tris(3-hydroxybutyrate) is administered orally. Again, the focal point is to achieve the appropriate ketone body (3-hydroxybutyroyl level plus acetoacetate level) in the blood of between 2 mM and 10 mM, preferably 4.5 mM to 7 mM, more preferably 5 mM to 7 mM, most preferably 5.5 mM to 7.5 mM. In cases where the actual volume or weight of this amount is too cumbersome or undesired to give as a single dose, the dose can be divided into multiple divided doses of desirable size given multiple times per day or in multiple dosage units given in a single dose (i.e. within a few moments of one another as desired). Preferably the dose is divided into 2-3 divided doses, spaced apart approximately equally over the course of a 24-hour period, so that twice daily dosing is approximately every 12 hours and thrice daily dosing is approximately every 8 hours. By way of example, if 50 g is desired to be administered, it can be done as a single dose of 50 g in a single dosage form or distributed in a food or drink or it can be administered in ½ such amounts twice daily, or it can be administered in a dosage form having h the dose in two dosage units given within a few moments of one another (preferably within a few seconds of one another when a substantially single dosing is desired). Where multiple dosings per day are desired or multiple dosage units per day at a single dosing are desired, other fractional dosings and multiple dosage units will be known to those of ordinary skill in the art and include without limitation administration of ⅓ the above amounts administered 3 times a day or in three units administered at substantially the same time; ¼ the above amounts administered 4 times a day or in four units administered at substantially the same time or 2 units twice in a day, etc. The intent and objective is to induce a therapeutic hyperketonemia characterized by blood levels of the 3-hydroxybutyroyl group

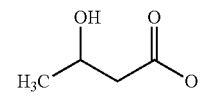

(together with the acetoacetate group) of 2 mM-10 mM, (such as 4.5 mM, 5.0 mM 5.5 mM, 6.0 mM, 6.5 mM, 7.0 mM or 7.5 mM, and all mM levels between any particular of these explicitly recited amounts is deemed to be explicitly disclosed as well) comparable to those achieved by ketogenic diet or starvation. Those of ordinary skill in the art will appreciate other variations on the theme.

The formulation is assembled by first preparing a pre-blend of the ethanol and water and the small amount of propylene glycol (which small amount is part of the pre-blend as indicated above) and then adding the flavor oil components thereto. Separately, the propylene glycol (that is indicated as the primary solvent is warmed to approximately 50° C. The high potency sweetener is added to the warmed propylene glycol and the bitter masking agent is then added to the warmed solution and mixed until dissolved. The warmed mixture is then allowed to cool to about 25° C., Then the flavor oil component is added and mixed for 5-10 minutes. The resulting mixture is then blended with the ketone compound to result in the final formulation.

As stated above, the process of arriving at an appropriate taste-masking formulation is one of trial and error. In point of fact, the present inventors tried a multitude of potential candidates without success. Numerous flavorings and media were tried for masking the bitterness of the ketone body compounds without success, whether as simply flavorings added to the ketone alone or by adding the ketone compound to a medium such as juices, soft drinks, puddings, ice creams, etc. without adequate success. Some of these efforts actually resulted in making the taste worse, not better. However, on arrival at the instantly claimed invention, the instant inventors finally found a formulation that met the criteria for having a delivery system that adequately masked the extreme bitterness of the ketone compounds.

The instant formulation can be administered as is, or added to virtually any desired food or drink as desired, but preferably is consumed as is.

Bitter mask agent compounds used in the instant formulation are compounds of Formula I:

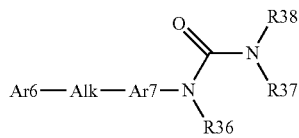

Formula I or a salt or N-oxide thereof, wherein Ar6 and Ar7 are the same or different, independently one from the other, and each is an optionally substituted five-membered heteroaryl group; Alk is an alkyl group; R36 and R37, together with the atoms to which they are attached, form an optionally substituted five-membered heterocycle; and R38 is H, substituted or unsubstituted alkyl, substituted or unsubstituted cycloalkyl alkyl, substituted or unsubstituted heterocycloalkylalkyl, substituted or unsubstituted aryl, substituted or unsubstituted arylamidoalkyl, substituted or unsubstituted heteroarylamidoalkyl, substituted or unsubstituted arylalkyl, substituted or unsubstituted arylalkoxy, substituted or unsubstituted beteroaryl, substituted or unsubstituted heteroarylalkyl, or haloalkyl.

In some variations, the compounds of Formula I are those wherein the five-membered heterocycle formed by R36 and R37 is a hydantoin or a substituted or unsubstituted cyclic urea, or a salt or N-oxide thereof.

In some variations, the bitter mask agent compounds used in the instant formulation are compounds of Formula II:

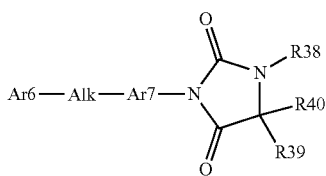

Formula II or a salt or N-oxide thereof, wherein Ar6 and Ar7 are the same or different, independently one from the other, and each is an optionally substituted five-membered heteroaryl group; Alk is an alkyl group; R38 is H, substituted or unsubstituted alkyl, substituted or unsubstituted cycloalkyl alkyl, substituted or unsubstituted heterocycloalkylalkyl, substituted or unsubstituted aryl, substituted or unsubstituted arylamidoalkyl, substituted or unsubstituted heteroarylamidoalkyl, substituted or unsubstituted arylalkyl, substituted or unsubstituted arylalkoxy, substituted or unsubstituted heteroaryl, substituted or unsubstituted heteroarylalkyl, or haloalkyl; and R39 and R40 are, the same or different independently one from the other, H, substituted or unsubstituted alkyl, substituted or unsubstituted cycloalkyl alkyl, substituted or unsubstituted heterocycloalkylalkyl, substituted or unsubstituted aryl, substituted or unsubstituted arylamidoalkyl, substituted or unsubstituted arylalkylamidoalkyl, substituted or unsubstituted heteroarylamidoalkyl, substituted or unsubstituted heteroarylalkylamidoalkyl, substituted or unsubstituted arylalkyl, substituted or unsubstituted arylalkoxy, substituted or unsubstituted heteroaryl, substituted or unsubstituted heteroarylalkyl, haloalkyl, or R39 and R40, together with the carbon atom to which they are attached, form a C=O group or a substituted or unsubstituted alkenyl group.

In some variations, the bitter mask agent compounds of Formula: II are those, wherein the five-membered heterocycle formed by R36 and R37 is a urazole, or a salt or N-oxide thereof.

In some variations, the bitter mask agent compounds used in the instant formulation are compounds of Formula III:

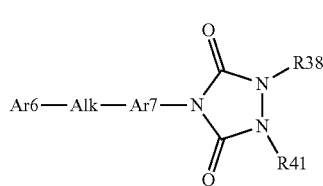

Formula III or a salt or N-oxide thereof, wherein Ar6 and Ar7 are the same or different, independently one from the other, and each is an optionally substituted five-membered heteroaryl group; Alk is an alkyl group; R38 is H, substituted or unsubstituted alkyl, substituted or unsubstituted cycloalkyl alkyl, substituted or unsubstituted heterocycloalkylalkyl, substituted or unsubstituted aryl, substituted or unsubstituted arylamidoalkyl, substituted or unsubstituted heteroarylamidoalkyl, substituted or unsubstituted arylalkyl, substituted or unsubstituted arylalkoxy, substituted or unsubstituted heteroaryl, substituted or unsubstituted heteroarylalkyl, or haloalkyl; and R41 is H, substituted or unsubstituted alkyl, substituted or unsubstituted cycloalkyl alkyl, substituted or unsubstituted heterocycloalkylalkyl, substituted or unsubstituted aryl, substituted or unsubstituted arylamidoalkyl, substituted or unsubstituted arylalkylamidoalkyl, substituted or unsubstituted heteroarylamidoalkyl, substituted or unsubstituted heteroarylalkylamidoalkyl, substituted or unsubstituted arylalkyl, substituted or unsubstituted arylalkoxy, substituted or unsubstituted heteroaryl, substituted or unsubstituted heteroarylalkyl, or haloalkyl.

In some variations, the bitter mask agent compounds used in the instant formulation are compounds of Formula IV:

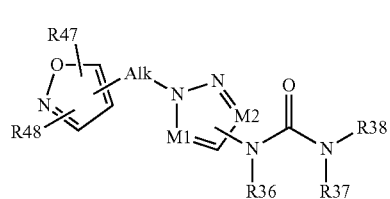

Formula IV or a salt or N-oxide thereof, wherein Alk is an alkyl group; M1 is N or CR49, wherein R49 is H or substituted or unsubstituted alkyl; M2 is N or CRSO, wherein R50 is H or substituted or unsubstituted alkyl; R36 and R37, together with the atoms to which they are attached, form an optionally substituted five-membered heterocycle; and R38 is H, substituted or unsubstituted alkyl, substituted or unsubstituted cycloalkyl alkyl, substituted or unsubstituted heterocycloalkylalkyl, substituted or unsubstituted aryl, substituted or unsubstituted arylamidoalkyl, substituted or unsubstituted heteroarylamidoalkyl, substituted or unsubstituted arylalkyl, substituted or unsubstituted arylalkoxy, substituted or unsubstituted heteroaryl, substituted or unsubstituted heteroarylalkyl, or haloalkyl; R47 is H, substituted or unsubstituted alkyl, substituted or unsubstituted alkoxy, substituted or unsubstituted aryl, substituted or unsubstituted arylalkyl, or halo; and R48 is H, substituted or unsubstituted alkyl, substituted or unsubstituted alkoxy, substituted or unsubstituted aryl, substituted or unsubstituted arylalkyl, or halo.

In some variations, the bitter mask agent compounds used in the instant formulation are compounds of Formula V:

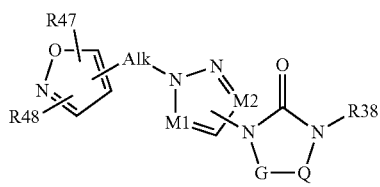

Formula V or a salt or N-oxide thereof, wherein Alk is an alkyl group; G is C=O and Q is CR51R52 or NR51, wherein R51 and R52 are, the same or different independently one from the other, H, substituted or unsubstituted alkyl, substituted or unsubstituted cycloalkyl alkyl, substituted or unsubstituted heterocycloalkylalkyl, substituted or unsubstituted aryl, substituted or unsubstituted arylamidoalkyl, substituted or unsubstituted arylalkylamidoalkyl, substituted or unsubstituted heteroarylamidoalkyl, substituted or unsubstituted heteroarylalkylamidoalkyl, substituted or unsubstituted arylalkyl, substituted or unsubstituted arylalkoxy, substituted or unsubstituted heteroaryl, substituted or unsubstituted heteroarylalkyl, haloalkyl, or R51 and R52, together with the carbon atom to which they are attached, form a C=O group or a substituted or unsubstituted alkenyl group; M1 is N or CR49, wherein R49 is H or substituted or unsubstituted alkyl; M2 is N or CR50, wherein R50 is H or substituted or unsubstituted alkyl; R38 is H, substituted or unsubstituted alkyl, substituted or unsubstituted cycloalkyl alkyl, substituted or unsubstituted heterocycloalkylalkyl, substituted or unsubstituted aryl, substituted or unsubstituted arylamidoalkyl, substituted or unsubstituted heteroarylamidoalkyl, substituted or unsubstituted arylalkyl, substituted or unsubstituted arylalkoxy, substituted or unsubstituted heteroaryl, substituted or unsubstituted heteroarylalkyl, or haloalkyl; R47 is H, substituted or unsubstituted alkyl, substituted or unsubstituted alkoxy, substituted or unsubstituted aryl, substituted or unsubstituted arylalkyl, or halo; and R48 is H, substituted or unsubstituted alkyl, substituted or unsubstituted alkoxy, substituted or unsubstituted aryl, substituted or unsubstituted arylalkyl, or halo.

A particularly preferred bitter mask agent for use in the present invention is a compound known as 3-(1-((3,5-Dimethylisoxazol-4-yl)methyl)-1H-pyrazol-4-yl-1-(3-hydroxybenzyl) imidazolidine-2,4-dione and is of Formula VI:

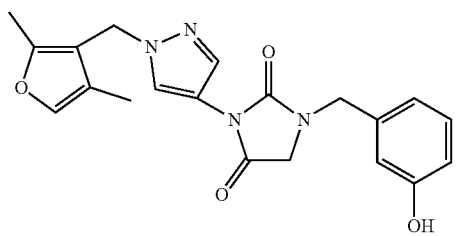

Formula VI or is a salt or N-oxide thereof.

With respect to the bitter mask agent used in the present invention and in further description of the compounds within one or more of formulae I-VI above, the following 23 paragraphs detail the various groupings mentioned.

As used herein, "alkyl" as well as other groups having the prefix "alk" such as, for example, alkoxy, alkanoyl, alkenyl, alkynyl and the like, means carbon chains which may be linear or branched or combinations thereof. Examples of alkyl groups include methyl, ethyl, propyl, isopropyl, butyl, sec- and tert-butyl, pentyl, hexyl, heptyl and the like. Preferred alkyl groups have 1-4 carbons. "Alkenyl" and other like terms include carbon chains containing at least one unsaturated carbon-carbon bond. "Alkynyl" and other like terms include carbon chains containing at least one carbon-carbon triple bond.

The term "cycloalkyl" means carbocycles containing no heteroatoms, and includes mono-, bi- and tricyclic saturated carbocycles, as well as fused ring systems. Examples of cycloalkyl include cyclopropyl, cyclobutyl, cyclopentyl, cyclohexyl, decahydronaphthalene, adamantane, indanyl, indenyl, fluorenyl, 1,2,3,4-tetrahydronaphthalene and the like.

The term "aryl" means an aromatic substituent that is a single ring or multiple rings fused together. Exemplary aryl groups include, without limitation, phenyl, naphthyl, anthracenyl, pyridinyl, pyrazinyl, pyrimidinyl, triazinyl, thiophenyl, furanyl, pyrrolyl, oxazolyl, imidazolyl, triazyolyl, and tetrazolyl groups. Aryl groups that contain one or more heteroatoms (e.g., pyridinyl) are often referred to as "heteroaryl groups." When formed of multiple rings, at least one of the constituent rings is aromatic. In some embodiments, at least one of the multiple rings comprise a heteroatom, thereby forming heteroatom-containing aryl groups. Heteroatom-containing aryl groups include, without limitation, benzoxazolyl, benzimidazolyl, quinoxalinyl, benzofuranyl, and 1H-benzo [d][1,2,3]triazolyl groups. Heteroatom-containing aryl groups also include, without limitation, 2,3-dihydrobenzo [b][1,4]dioxinyl and benzo [d][1,3]dioxolyl groups. Heteroatom-containing aryl groups also include aromatic rings fused to a heterocyclic ring comprising at least one heteroatom and at least one carbonyl group. Such groups include, without limitation, dioxo tetrahydroquinoxalinyl and dioxo tetrahydroquinazolinyl groups.

The term "arylalkoxy" means an aryl group bonded to an alkoxy group.

The term "arylamidoalkyl" means an aryl-C(O) NR-alkyl or aryl-NRC(O)-alkyl.

The term "arylalkylamidoalkyl" means an aryl-alkyl-C(O) NR-alkyl or aryl-alkyl-NRC(O)-alkyl, wherein R is any suitable group listed below.

The term "arylalkyl" refers to an aryl group bonded to an alkyl group.

The term "halogen" or "halo" refers to chlorine, bromine, fluorine or iodine.

The term "haloalkyl" means an alkyl group having one or more halogen atoms (e.g., CF3).

The term "heteroalkyl" refers to an alkyl moiety which comprises a heteroatom such as N, O, P, B, S, or Si. The heteroatom may be connected to the rest of the heteroalkyl moiety by a saturated or unsaturated bond. Thus, an alkyl substituted with a group, such as heterocycloalkyl, substituted heterocycloalkyl, heteroaryl, substituted heteroaryl, alkoxy, aryloxy, boryl, phosphino, amino, silyl, thio, or seleno, is within the scope of the term heteroalkyl. Examples of heteroalkyls include, but are not limited to, cyano, benzoyl, 2-pyridyl and 2-furyl.

The term "heteroarylalkyl" means a heteroaryl group to which an alkyl group is attached.

The term "heterocycle" means a monocyclic or polycyclic ring comprising carbon and hydrogen atoms, optionally having 1 or 2 multiple bonds, and the ring atoms contain at least one heteroatom, specifically 1 to 4 heteroatoms, independently selected from nitrogen, oxygen, and sulfur. Heterocycle ring structures include, but are not limited to, mono-, bi-, and tri-cyclic compounds. Specific heterocycles are monocyclic or bicyclic. Representative heterocycles include cyclic ureas, morpholinyl, pyrrolidinonyl, pyrrolidinyl, piperidinyl, piperazinyl, hydantoinyl, valerolactamyl, oxiranyl, oxetanyl, tetrahydrofuranyl, tetrahydropyranyl, tetrahydropyridinyl, tetrahydroprimidinyl, tetrahydrothiophenyl, tetrahydrothiopyranyl, tetrazolyl, and urazolyl. A heterocyclic ring may be unsubstituted or substituted. Preferred heterocycles are 5- and 6-membered heterocycles, particularly hydantoinyl and urazolyl.

The term "heterocycloalkyl" refers to a cycloalkyl group in which at least one of the carbon atoms in the ring is replaced by a heteroatom (e.g., O, S or N).

The term "heterocycloalkylalkyl" means a heterocycloalkyl group to which the an alkyl group is attached.

The term "substituted" specifically envisions and allows for one or more substitutions that are common in the art. However, it is generally understood by those skilled in the art that the substituents should be selected so as to not adversely affect the useful characteristics of the compound or adversely interfere with its function. Suitable substituents may include, for example, halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, amino groups, alkyl- and dialkylamino groups, carbamoyl groups, alkylcarbonyl groups, carboxyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, cycloalkyl groups, cyano groups, C1-C6 alkylthio groups, arylthio groups, nitro groups, keto groups, acyl groups, boronate or boronyl groups, phosphate or phosphonyl groups, sulfamyl groups, sulfonyl groups, sulfinyl groups, and combinations thereof. In the case of substituted combinations, such as "substituted arylalkyl," either the aryl or the alkyl group may be substituted, or both the aryl and the alkyl groups may be substituted with one or more substituents. Additionally, in some cases, suitable substituents may combine to form one or more rings as known to those of skill in the art.

Compounds described herein contain one or more double bonds and may thus give rise to cis/trans isomers as well as other conformational isomers. The present invention includes all such possible isomers as well as mixtures of such isomers.

Compounds described herein, and particularly the substituents described above, may contain one or more asymmetric centers and may thus give rise to diastereomers and optical isomers. The present invention includes all such possible diastereomers as well as their racemic mixtures, their substantially pure resolved enantiomers, all possible geometric isomers, and acceptable salts thereof. Further, mixtures of stereoisomers as well as isolated specific stereoisomers are also included. During the course of the synthetic procedures used to prepare such compounds, or in using racemization or epimerization procedures known to those skilled in the art, the products of such procedures can be a mixture of stereoisomers.

As used herein, the term "salts" and "pharmaceutically acceptable salts" refer to derivatives of the disclosed compounds wherein the parent compound is modified by making acid or base salts thereof. Examples of pharmaceutically acceptable salts include, but are not limited to, mineral or organic acid salts of basic groups such as amines; and alkali or organic salts of acidic groups such as carboxylic acids. Pharmaceutically acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

The pharmaceutically acceptable salts of the present invention can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in Remington's Pharmaceutical Sciences, 17th ed., Mack Publishing Company, Easton, Pa., 1985, p. 1418.

The term "solvate" means a compound, or a salt thereof, that further includes a stoichiometric or non-stoichiometric amount of solvent bound by non-covalent intermolecular forces. Where the solvent is water, the solvate is a hydrate.

The term "prodrug" means a derivative of a compound that can hydrolyze, oxidize, or otherwise react under biological conditions (in vitro or in vivo) to provide an active compound, particularly a compound of the invention. Examples of prodrugs include, but are not limited to, derivatives and metabolites of a compound of the invention that include biohydrolyzable moieties such as biohydrolyzable amides, biohydrolyzable esters, biohydrolyzable carbamates, biohydrolyzable carbonates, biohydrolyzable ureides, and biohydrolyzable phosphate analogues. Specific prodrugs of compounds with carboxyl functional groups are the lower alkyl esters of the carboxylic acid. The carboxylate esters are conveniently formed by esterifying any of the carboxylic acid moieties present on the molecule. Prodrugs can typically be prepared using well-known methods, such as those described by Burger's Medicinal Chemistry and Drug Discovery 6th ed. (Donald J. Abraham ed., 2001, Wiley) and Design and Application of Prodrugs (H. Bundgaard ed., 1985, Harwood Academic Publishers Gmfh).

As used herein, and unless otherwise indicated, the terms "biohydrolyzable amide," "biohydrolyzable ester," "biohydrolyzable carbamate," "biohydrolyzable carbonate," "biohydrolyzable ureido," "biohydrolyzable phosphate" mean an amide, ester, carbamate, carbonate, ureido, or phosphate, respectively, of a compound that either: 1) does not interfere with the biological activity of the compound but can confer upon that compound advantageous properties in vivo, such as uptake, duration of action, or onset of action; or 2) is biologically inactive but is converted in vivo to the biologically active compound. Examples of biohydrolyzable esters include, but are not limited to, lower alkyl esters, alkoxyacyloxy esters, alkyl acylamino alkyl esters, and choline esters. Examples of biohydrolyzable amides include, but are not limited to, lower alkyl amides, «-amino acid amides, alkoxyacyl amides, and alkylaminoalkylcarbonyl amides. Examples of biohydrolyzable carbamates include, but are not limited to, lower alkylamines, substituted ethylenediamines, aminoacids, hydroxyalkylamines, heterocyclic and heteroaromatic amines, and polyether amines.

As used herein, the term "analog thereof" in the context of the compounds disclosed herein includes diastereomers, hydrates, solvates, salts, prodrugs, and N-oxides of the compounds.

EXAMPLES

The following examples exemplify, but do not limit, the present invention.

Example 1

A preferred formulation of GTβHB is prepared as set forth in the following TABLE I

| Flavor component pre-mix | |
|---|---|
| Flavor Oil | 0.439% (95% Orange oil 5% other natural flavors) |
| Propylene Glycol | 0.125% |
| 95% Ethanol | 0.343% |
| Water | 0.471% |
| Subtotal | 1.378% |

The propylene Glycol, water, and ethanol are blended together and put aside.

| Second Premix | |
|---|---|
| Propylene Glycol | 9.588% |
| Sucralose | 1.986% |
| Senomyx BB68 | 0.048% |
| Subtotal | 11.622% |

The propylene Glycol is warmed to 50° C. and the sucralose is added and dissolved. Next, the Senomyx BB68 is added and mixed until dissolved. The solution is allowed to cool to 25° C. Then the Flavor Premix is added to the Second Premix resulting in a mixture making up 13% of the final formulation. This is then blended with Glyceryl tris(3-hydroxcybutyrate) in an amount of 87% of the final formulation to result in 100% of the final formulation.

The invention claimed is:

1. An oral formulation of at least one distasteful ketone body material comprising:
   (a) said ketone body material
   (b) propylene glycol;
   (c) aqueous ethanol;
   (d) water in addition to that contributed by said aqueous ethanol, hereinafter "additional water";
   (e) natural or synthetic flavor, comprising at least one flavor oil, at least 90% of the flavor oils being orange flavor oils, grape flavor oils, or a mixture thereof;
   (f) high potency sweetener; and
   (g) bitter mask agent;
   wherein said ketone body material is selected from at least one entity of the group consisting of an alkali metal salt of a ketone body compound, ketone body esters, ketone body amides, and mixtures thereof,
   said ketone body compounds are selected from the group consisting of 3-hydroxybutyric acid, and acetoacetic acid;
   said ketone body esters are selected from the group consisting of (i) esters between the hydroxyl group of a first 3-hydroxybutyric acid and an acid group of a second ketone body compound, which second ketone body compound is selected from any of said ketone body compounds, (ii) esters between a ketone body compound and a ketone body precursor, (iii) esters between a ketone body compound and glycerin, and (iv) mixtures thereof;
   said ketone body amides are selected from the group consisting of amides formed between said ketone body compounds and a physiologically acceptable amine, and wherein said bitter mask agent is is the compound 3-(1-((3,5-Dimethylisoxazol-4-yl)methyl)-1H-pyrazol-4-yl)-1-(3-hydroxbenzyl)imidazolidine-2,4-dione of Formula

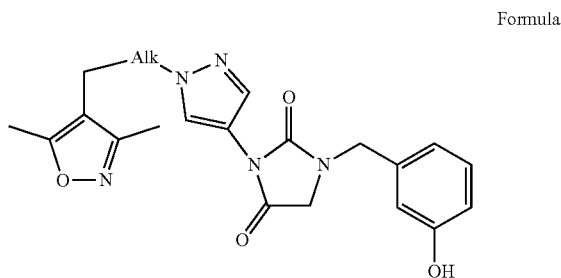

Formula or a salt or N-oxide thereof.

2. The formulation of claim 1 wherein said ketone body material is said ester between a ketone body and glycerin.

3. The formulation of claim 2 wherein said ketone body material is a glyceryl (3-hydroxybutyrate).

4. The formulation of claim 3 wherein said glyceryl (3-hydroxybutyrate) is selected from the group consisting of a glyceryl tris (3-hydroxybutyrate), a glyceryl bis (3-hydroxybutyrate), a glyceryl mono(3-hydroxybutyrate), a glyceryl bis(3-hydroxybutyrate)-mono(3-omega fatty acid ester), a glyceryl bis(3-hydroxybutyrate)-mono(6-omega fatty acid ester), a glyceryl mono(3-hydroxybutyrate)-di(6-omega fatty acid ester), a glyceryl mono(3-hydroxybutyrate)-mono(3-omega fatty ester)-mono(6-omega fatty acid ester), a glyceryl bis(3-hydroxybutyrate)-mono(3,6-omega fatty acid ester), a glyceryl mono(3-hydroxybutyrate)-di(3-omega fatty acid ester), a glyceryl mono(3-hydroxybutyrate)-di (3,6-omega fatty acid ester), a glyceryl mono(3-hydroxybutyrate)-mono(3-omega fatty acid ester)-mono(3,6-omega fatty acid ester), a glyceryl mono(3-hydroxybutyrate)-mono(6-omega fatty acid ester)-mono(3,6-omega fatty acid ester), any of the foregoing having one or more of the omega fatty acid or unesterified hydroxyl groups replaced by a medium-chain fatty acid ester group, and mixtures thereof, wherein multiple omega fatty acid groups in a single molecule are the same or different, and wherein multiple medium-chain fatty acid groups in a single molecule are the same or different; and each 3-hydroxybutyrate group is independently selected from D and L forms thereof.

5. The formulation of claim 4 wherein said glyceryl (3-hydroxybutyrate) is at least one of glyceryl tris (3-hydroxybutyrate) wherein each 3-hydroxybutyrate group is independently in the D or L form, and is at least one of glyceryl tris(D-3-hydroxybutyrate), glyceryl tris(L-3-hydroxybutyrate), glyceryl bis(D-3-hydroxybutyrate)-mono(L-3-hydroxybutyrate), glyceryl bis(L-3-hydroxybutyrate)-mono(D-3-hydroxybutyrate).

6. The formulation of claim 5 wherein the glyceryl tris (3-hydroxybutyrate) is glyceryl tris (DL-3-hydroxybutyrate).

7. The formulation of claim 1 wherein said formulation is
(a) 85.0 pbw to 89.0 pbw of said ketone body material;
(b) 8.402 pbw to 11.076 pbw of said propylene glycol;
(c) said aqueous ethanol, based on the ethanol content thereof, in an amount corresponding to 0.0278 pbw to 0.415 pbw of 95% ethanol;
(d) 0.38 pbw to 0.57 pbw of said additional water;
(e) 0.35 pbw to 0.54 pbw of said natural or synthetic flavor;
(f) 1.609 pbw to 2.404 pbw of said high potency sweetener; and
(g) 0.039 pbw to 0.06 pbw of said bitter mask agent.

8. The formulation of claim 7 wherein said ketone body material is glyceryl tris(3-hydroxybutyrate).

9. The formulation of claim 1 wherein said formulation comprises
(a) about 87 pbw of said ketone body material;
(b) about 9.613 pbw of said propylene glycol;
(c) about 0.343 pbw of said 95% ethanol;
(d) about 0.471 pbw of said additional water;
(e) about 0.439 pbw of said natural or synthetic flavor;
(f) about 1.986 pbw of said high potency sweetener; and
(g) about 0.048 pbw of said bitter mask agent which is the compound 3-(1-((3,5-Dimethylisoxazol-4-yl)methyl)-1H-pyrazol-4-yl)-1-(3-hydroxbenzyl)imidazolidine-2,4-dione.

10. The formulation of claim 1 wherein said formulation consists of
(a) about 87 pbw of said ketone body material;
(b) about 9.613 pbw of said propylene glycol;
(c) about 0.343 pbw of said 95% ethanol;
(d) about 0.471 pbw of said additional water;
(e) about 0.439 pbw of said natural or synthetic flavor;
(f) about 1.986 pbw of said high potency sweetener, which high potency sweetener is sucralose; and
(g) about 0.048 pbw of said bitter mask agent which is the compound 3-(1-((3,5-Dimethylisoxazol-4-yl)methyl)-1H-pyrazol-4-yl)-1-(3-hydroxbenzyl)imidazolidine-2,4-dione.

11. The formulation of claim 1 wherein said natural or synthetic flavor is a natural flavor composition and comprises at least 90% of either orange natural flavor or grape natural flavor.

* * * * *